United States Patent [19]

Suzuki et al.

[11] Patent Number: 4,670,067
[45] Date of Patent: Jun. 2, 1987

[54] BRAZING FLUX

[75] Inventors: Kenichi Suzuki; Fusayoshi Miura; Fumio Shimizu, all of Aichi, Japan

[73] Assignee: Kabushiki Kaisha Toyota Chuo Kenkyusho, Japan

[21] Appl. No.: 843,194

[22] Filed: Mar. 24, 1986

[30] Foreign Application Priority Data

Apr. 9, 1985 [JP] Japan ................................. 60-74671

[51] Int. Cl.$^4$ ............................................. B23K 35/34
[52] U.S. Cl. .......................................... 148/26; 148/24
[58] Field of Search .......................................... 148/26

[56] References Cited

U.S. PATENT DOCUMENTS

| | | | |
|---|---|---|---|
| 3,865,578 | 2/1975 | Takashima | 148/26 |
| 3,951,328 | 4/1976 | Wallace | 148/26 |
| 4,131,493 | 12/1978 | Gurevich | 148/26 |
| 4,224,086 | 9/1980 | Stokes | 148/26 |
| 4,475,960 | 10/1984 | Yamawaki | 148/26 |
| 4,579,605 | 4/1986 | Kawase | 148/26 |

Primary Examiner—Peter D. Rosenberg
Attorney, Agent, or Firm—Berman, Aisenberg & Platt

[57] ABSTRACT

A brazing flux having a composition corresponding to 0 (not inclusive) to 62 mol % of potassium fluoride, 2 to 74 (not inclusive) mol % of cesium fluoride and 26 to 67 mol % of aluminum fluoride, said flux including potassium and cesium as fluoro-aluminum-complexes and not including free cesium fluoride and potassium fluoride, thus having a melting starting point within the range of 440°–580° C.

5 Claims, 12 Drawing Figures

TEMPERATURE (°C)

Co - Kα 2θ

TEMPERATURE (°C)

Co - Kα 2θ

BRAZING FLUX

BACKGROUND OF THE INVENTION

1. Field of the Invention

This invention relates to a brazing flux composed of a mixture of fluoro-aluminum-complexes including potassium and cesium.

2. Description of the Prior Art

When aluminum or an aluminum-alloy (hereinafter will be merely called an aluminum material) is brazed, it has been usual to employ (as a brazing filler metal) a eutectic alloy of aluminum and silicon having a melting point which is somewhat lower than that of the aluminum material. In order to bond the filler metal to the aluminum material satisfactorily, it is necessary to remove an oxide film from the surface of the aluminum material. For that purpose, a flux is applied to a portion of the material to be brazed together with the filler metal. There has recently come to be used a non-corrosive flux composed of potassium fluoride-aluminum fluoride ($KF-AlF_3$) complex. This substance melts at the eutectic point of $KF-AlF_3$ and exhibits an excellent flux action. It is, however, at a temperature of 560° C. or above that this flux begins to melt (U.S. Pat. No. 3,951,328). It is, therefore, necessary to use a brazing filler metal having a melting point which is several tens of degrees higher than 560° C., and employ a correspondingly high brazing temperature. When a torch, such as acetylene flame or the like, is used as a source of heat for brazing, it is difficult to control the brazing temperature if the melting points of the filler metal and flux are high. Therefore, the use of the $KF-AlF_3$ flux requires a high degree of skill and experience.

The applicant has found that a composite of cesium fluoride-aluminum fluoride ($CsF-AlF_3$) melts at an extremely low temperature compared with the $KF-AlF_3$ flux. And moreover, it exhibits an effective flux action for the aluminum material containing magnesium (Mg). These have been filed with titles of the invention of "Brazing Flux" (PCT Application No. JP85/00705) and "A Method of Brazing an Aluminum Material" (Japanese patent application No. 10445/1985), respectively.

This $CsF-AlF_3$ flux begins to melt at a low temperature, such as 440° C. to 460° C., and, therefore, it is possible to use a filler metal having a melting point which is about 120° C. lower than that of the $KF-AlF_3$ flux. Consequently, the brazing temperature can be also lowered.

However, when it is necessary to use a filler metal having a high melting point (for example, in case that an aluminum filler metal containing Cu cannot be applied to an aluminum material used in a corrosive environment), the difference between the melting temperature of the flux and the brazing temperature becomes too large so that sublimation and oxidation of the flux are promoted while the material to be brazed is heated to the brazing temperature. And consequently, it has been encountered that most of the flux cannot effectively be used. So, the inventor's investigations have progressed in order to obtain a flux the melting temperature of which can suitably be selected, leaving merits of the CsF flux herein.

SUMMARY OF THE INVENTION

It is, therefore, an object of this invention to provide a non-corrosive brazing flux the melting starting point of which can be controlled within a temperature range of from 440° C. to 580° C., and which is effective for brazing an aluminum material containing magnesium, too.

This object is attained by a brazing flux having a composition corresponding to 0 ( not inclusive) to 62 mol % of potassium fluoride, 2 to 74 (not inclusive) mol % of cesium fluoride and 26 to 67 mol % of aluminum fluoride, wherein said flux includes potassium and cesium as fluoro-aluminum-complexes but does not include free cesium fluoride or potassium fluoride.

BRIEF DESCRIPTION OF THE DRAWINGS

FIG. 5 illustrates a fillet having a uniform width, evaluated as A in brazeability;

FIG. 6 illustrates another fillet lacking only uniformity in width but having no defective brazed joint, evaluated as B in brazability;

DETAILED DESCRIPTION OF THE INVENTION

The brazing flux of this invention comprises not more than 62 mol % (not including 0 mol %) of potassium fluoride, 2 to 74 mol % (not including 74 mol %) of cesium fluoride and 26 to 67 mol % of aluminum fluoride, wherein potassium and cesium exist as fluoro-aluminum complexes but there is not contained free cesium fluoride or potassium fluoride.

Figure 1:
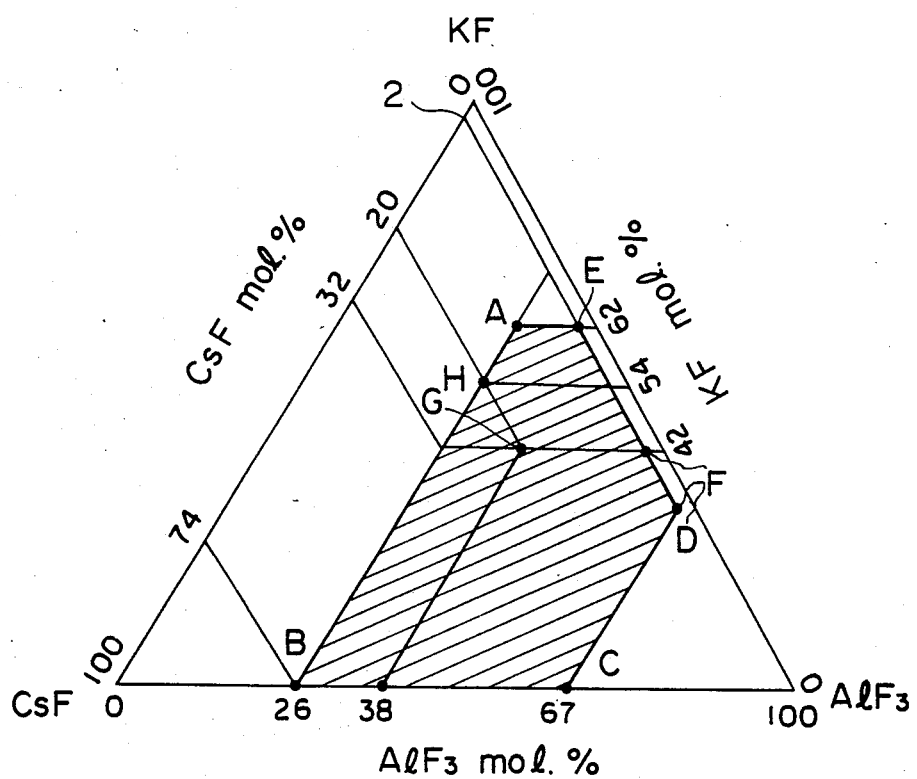
FIG. 1 is a $KF-CsF-AlF_3$ triangular coordinate diagram showing the inventive composition range of a flux according to the present invention.

The aforesaid inventive composition range of the brazing flux according to this invention is as shown in FIG. 1 when represented by a $KF-CsF-AlF_3$ triangular coordinate diagram of Gibbs. Namely, the brazing flux according to this invention has a composition within the inventive composition range which is represented by the hatched area enclosed by lines AB, BC, CD, DE and EA in FIG. 1. In this case, however, a composition on line BC is out of the inventive composition range of the flux according to this invention.

In the brazing flux according to this invention, cesium and potassium exist as fluoro-aluminum-complexes, for example, expressed in $Cs_{3x}K_{3-3x}AlF_6$, $Cs_{2x}K_{2-2x}AlF_5 \cdot H_2O$, $Cs_xK_{1-x}AlF_4$ ($0 \leq x \leq 1$), or the like. The fluoro-aluminum-complexes complexes are referred to as cesium potassium fluoroaluminate, cesium fluoroaluminate or potassium fluoroaluminate. A lot of different complexes exist among those known as fluoro-aluminum-complex and there also exist a lot of complexes of the same composition which differ from one another in structure, depending on temperature.

The melting point of the brazing flux according to this invention changes depending on the composition ratio of $AlF_3$, CsF and KF. A brazing flux, having a composition within the inventive composition range represented by the shadowed area of FIG. 1, melts or begins to melt at a temperature of from 440° C. to 580° C.

If the proportion of $AlF_3$ content exceeds 67 mol %, the fluidity of melted flux may be lowered with a resultant reduction in brazability. On the other hand, if $AlF_3$ is less than 25 mol %, the proportion of CsF or KF content is relatively increased and the composition has free CsF or KF. As a result, the complex absorbs moisture and it may corrode the aluminum material to be brazed.

If the proportion of CsF content is less than 2 mol %, the obtained complex exhibits an extremely poor effect as a flux for the aluminum material containing magnesium. It is, therefore, difficult to use as a flux for brazing aluminum material containing magnesium.

If the proportion of KF content exceeds 62 mol % and also the proportion of $AlF_3$ content is more than 25 mol %, the obtained complex has a melting point of about 590° C. so that it is difficult to use as a flux.

In the inventive composition range defined by the shadowed area of FIG. 1, the preferable composition range is the area enclosed by lines HB, BC, CD, DF, FG and GH of FIG. 1. (In this case, compositions on lines BC, FG and GH are not included in the aforesaid preferable composition range shown in FIG. 1.) The preferable composition range comprises a first composition range comprising 2 to 74 mol % (not including 74 mol %) of CsF, not more than 42 mol % (not including 0 mol %) of KF and 26 to 67 mol % of $AlF_3$, and a second composition range comprising 20 to 32 mol % (not including 20 mol %) of CsF, 42 to 54 mol % of KF and 26 to 38 mol % (not including 38 mol %) of $AlF_3$. A flux having a composition within the aforesaid preferable composition range provides the following advantage. Namely, it is easy to make an adjustment of the melting point of the flux and the melting point of a brazing filler metal such as a eutectic alloy of aluminum and silicon (which begins to melt at a temperature of 580° C.) or an Al-Si-Cu alloy (which begins to melt at a temperature of 521° C.), which is usually used for this purpose. In case where the conventional filler metal composed of the eutectic alloy of aluminum and silicon is used for brazing together with a $KF-AlF_3$ flux, the temperature difference between the melting point of the filler metal and the melting temperature of the flux is about 20° C. Therefore, a little more temperature difference is necessary to facilitate the brazing work. According to this invention, since a complex the melting point of which is lower than 530° C. can be selected as a brazing flux, the aforesaid temperature difference between the melting point of the filler metal and the melting point of the flux, can be increased to 50° C. or more. Therefore, even if there is used a filler metal composed of the eutectic alloy of aluminum and silicon having a relatively high melting point, the brazing work is facilitated.

The flux of this invention can be produced by a variety of methods as will be hereunder described by way of example. According to a first method, potassium fluoroaluminates, cesium fluoroaluminates, cesium potassium fluoroaluminates and aluminum fluoride are separately produced as starting materials and then suitable materials are selected from these materials to be blended to have the inventive composition ratio as previously described. This method is advantageous in that a desired flux composition can freely be selected on the actual brazing spot.

According to a second method, powders of $AlF_3$, CsF and KF are mixed with an appropriate ratio and the mixture is heated in a crucible to be melted, followed by cooling to be solidified. Then, the resulting solid is pulverized to produce a brazing flux according to this invention. In the case of this method, it is advisable to employ a relatively large quantity of $AlF_3$ when preparing the mixture, since $AlF_3$ is likely to decrease by sublimation when the mixture is melted.

According to a third method, $AlF_3$, particularly such as $AlF_3 \cdot 3H_2O$, CsF and KF powders are first mixed with a predetermined composition ratio to prepare an appropriate mixture, and water is added to the mixture to form a paste or slurry. And then, the paste or slurry is left at ordinary temperature for a long time, or at a temperature not exceeding 100° C. for about an hour, and aged. In this case the gradual reaction of $AlF_3$, which is hard to dissolve in water, CsF and KF, which are soluble in water, forms a mixture of fluoro-aluminum-complexes. This method enables the formation of a mixture of fluoro-aluminum-complexes or a mixture of fluoro-aluminum-complexes and $AlF_3$, which has a desired composition, without causing any loss of $AlF_3$, CsF and KF.

According to a fourth method, aluminum hydroxide $[Al(OH)_3]$ or metallic aluminum is dissolved in an aqueous solution of hydrogen fluoride or a mixture of cesium hydroxide (CsOH) and potassium hydroxide (KOH). The resulting solution is neutralized with an aqueous solution of hydrogen fluoride or the mixture of CsOH and KOH which has not been used for dissolving aluminum hydroxide or metallic aluminum, whereby a mixture of fluoro-aluminum-complexes is precipitated in the neutralized solution.

According to a fifth method, $Al(OH)_3$, CsOH and KOH are mixed in an aqueous solution of hydrogen fluoride and the resulting solution is stirred to cause the reaction of Al, Cs, K and F to form a mixture of fluoro-aluminum-complexes.

The aqueous solution containing the reaction product obtained by the third, fourth or fifth method may be dried as it is. Alternatively, the precipitation of a mixture of fluoro-aluminum-complexes is collected from the solution by a filter and dried at a temperature which is lower than its melting point. In the aforesaid manner, a mixture of fluoro-aluminum-comlexes can be obtained as a brazing flux of this invention.

Even if about several % of alkali metal or alkaline-earth metal is contained in a starting material used to produce the aforesaid flux, it has no influence on brazing efficiency. On the other hand, even if the flux contains about several % of an aluminum oxide, aluminum hydroxide, such as $Al_2O_3$, $Al(OH)_3$, or an aluminum compound containing fluorine and hydroxyl, there is no reduction in brazing efficiency.

The brazing flux of this invention can be used for brazing in accordance with a conventional method. The flux in powder form is dispersed in a solvent, such as water or alcohol, to prepare paste, slurry or suspension, and the resultant is applied to an appropriate portion of an aluminum material by brushing, spraying or dipping. The flux preferably has a particle size not exceeding 20 or 30 microns to facilitate the application of flux thereto.

Then, a filler metal is fed to that brazing desired portion of the material. It is appropriate to use a filler metal having a melting point which is about 10° C. to 100° C. or 50° C. to 100° C. higher than that of the flux. Since the melting point of the flux can be appropriately controlled by changing the flux composition, it is, of course, possible to use a eutectic alloy of aluminum and silicon having a silicon content of 7 to 12% by weight (e.g., an alloy designated by Japanese Industrial Standard as A4343 or A4047), as the filler metal. In addition, it is also possible to use an alloy having a lower melting point, for example. an Al-Si-Cu alloy designated by JIS as A4145 which begins to melt at a temperature of about 521° C., or an Al-Si-Cu-Zn alloy which begins to melt at about 516° C.

Then, that portion of the material to be brazed is heated by a torch or furnace. If a furnace is used, it is preferably filled with a non-oxidizing atmosphere, such as nitrogen, though a furnace filled with air can also be employed.

The flux first melts and reacts with $Al_2O_3$ on the surface of the aluminum material to remove it therefrom. The melted flux does not react with the aluminum material. As the temperature further rises, the filler metal melts and the molten alloy flows smoothly on the surface of aluminum material, from which $Al_2O_3$ has been removed, and that portion of the material to be brazed is filled with the molten alloy. Then, the brazed material is taken out of the furnace to be cooled so that the filler metal is solidified to form a joint at that portion of the material which is to be joined to another material. In this case, if the aluminum material contains magnesium, it is also possible to form such a satisfactory joint. The remainder of the flux after brazing is hard to dissolve in water and it does not corrode the aluminum material or the brazing alloy. As the material to be brazed, there may also be used a combination of the aluminum material and a metallic material, such as iron, titanium or a nickel material, in addition to a combination of materials belonging to the same aluminum material.

Comparative to a conventional flux composed of potassium fluoroaluminates, which has a fixed melting point, according to the flux of this invention, the melting starting point thereof can freely be controlled within the temperature range of 440° C. to 580° C. by changing the composition ratio of the flux. And therefore, a brazing filler metal to be used for brazing can be freely selected.

In addition, the flux of this invention can remove an oxide film from the surface of the aluminum material containing magnesium to increase the wetting of the molten filler metal on the surface thereof. Therefore, the brazing alloy is uniformly distributed to that portion of the material to be brazed to form a satisfactory joint at that portion of the material which is to be joined to another material. Further, there is no necessity for cleaning the brazed material since the remainder of the flux after brazing does not corrode the aluminum material and the filler metal.

The invention will be described more specifically with reference to a plurality of examples.

EXAMPLE 1

Figure 2:
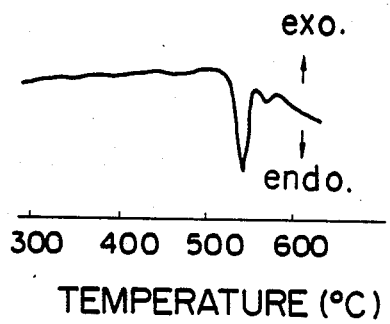
FIG. 2 is a DTA curve obtained from a flux according to Example 1.
Figure 3:
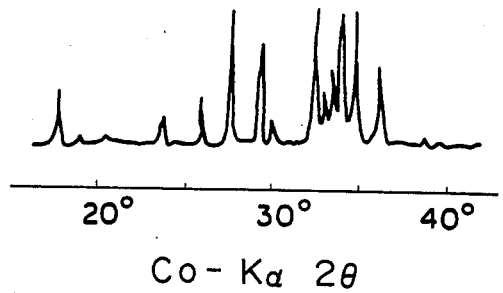
FIG. 3 is an X-ray diffraction pattern of the flux according to Example 1.

CsF, KF and $AlF_3$ powders were mixed in composition ratios (mol %) as shown at Run Nos. 1 to 12 in Table 1. Each of the resulting mixtures was fused in a crucible having a stream of nitrogen and cooled to be solidified. Then, the solidified product thereof was pulverized into a powder having a particle size not exceeding 200 mesh to obtain a flux according to this invention. Each flux was subjected to differential thermal analysis (DTA) and diffraction by Co-$K\alpha$ rays. The melting point of each flux obtained from the DTA curve is shown in Table 1. From X-ray diffraction of each flux, it has been recognized that each flux is a mixture of comlexes having a complicated structure, and free KF and CsF do not exist therein. FIGS. 2 and 3 show by way of example the DTA curve of the flux according to Run No. 12 and the diffraction pattern by Co-$K\alpha$ rays.

Figure 4:
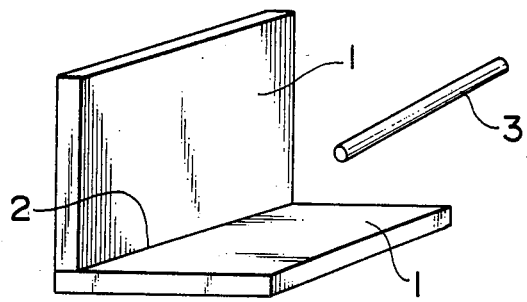
FIG. 4 is a perspective view of the aluminum materials brazed in Example 1.
Figure 5:
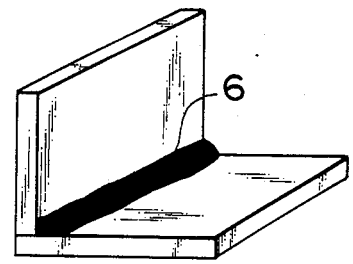
FIGS. 5 and 6 are respectively perspective views of brazed materials obtained in Examples of this invention, each having a fillet formed along a joint between the brazed materials.
Figure 6:
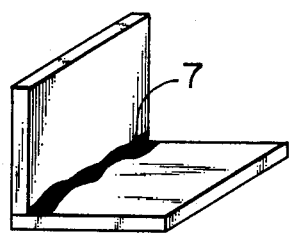

Next, in order to examine an effect of the flux action, each flux was tested for brazing as will hereunder be described. Water was added to the flux in the form of powder to form a slurry. The slurry of the flux was applied by brushing to an area 2 of contact between two sheets 1 of an aluminum alloy designated by JIS as A3003 as shown in FIG. 4. Each sheet 1 had a width of 2 cm, a length of 3 cm and a thickness of 3 mm and was secured to the other sheet by a jig (not shown). Then, one end of a filler metal wire 3 (designated by JIS as A4047), having a diameter of 2 mm, and to which a similar slurry had been applied, was brought into close proximity to the corner between the two sheets 1, and the heat of an oxygen-acetylene flame produced by torch burner (not shown) was applied thereto for brazing the two sheets. As a result, the molten filler metal penetrates the contacting portions of two sheets satisfactorily and a satisfactory brazed joint was easily formed therebetween. Each flux according to this invention enabled the formation of a fillet, as shown in FIGS. 5 and 6. Each of the fluxes according to Run Nos. 2, 5 to 12 enabled the formation of a satisfactory fillet 6 of uniform width along a joint 2 between the two sheets, as shown in FIG. 5. The results of brazing were satisfactory in view of such an obtained fillet and therefore, the brazability in use of each flux was evaluated as A. Each of the fluxes according to Run Nos. 1, 3 and 4 enabled the formation of a fillet 7 having a little lack of uniformity in width as shown in FIG. 6. The results of brazing were substantially satisfactory in view of the obtained fillet 7 and, therefore, the brazability in use of each flux was evaluated as B. In this case, the melting point of each flux was in the range of 535° C. to 580° C. so that it was difficult to control the brazing temperature properly. However, each flux yielded no defective brazed joint.

Figure 7:
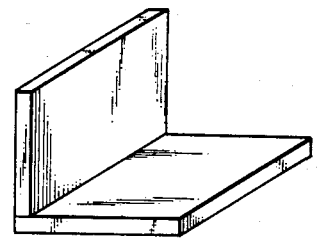
FIG. 7 is a perspective view of brazed materials obtained in Examples for comparison, having no fillet along a joint between the brazed materials, evaluaded as C in brazability of a flux.

For comparative purpose, fluxes according to Run Nos. C1 and C2 were prepared, respectively, and which were out of the composition range of the inventive flux in proportion of each of CsF, KF and $AlF_3$. These fluxes were tested for brazing as hereinabove described. The melting of these comparative fluxes required a temperature higher than 580° C. and it was impossible to form a fillet as shown in FIG. 7. The results of brazing were unsatisfactory in view of no fillet formation and, therefore, the brazability of each flux was evaluated as C. On the other hand, the brazed product obtained by each of the fluxes according to Run Nos. 1 to 12 was left in ion exchange water having a temperature of 50° C. for two weeks, but did not show any trace of corrosion.

TABLE 1

| Run No. | Composition of flux (mol %) | | | Melting starting point of flux (°C.) | Brazing efficiency of flux |
| --- | --- | --- | --- | --- | --- |
| | CsF | KF | AlF$_3$ | | |
| 1 | 6 | 62 | 32 | 580 | B |
| 2 | 24 | 48 | 28 | 505 | A |
| 3 | 16 | 48 | 36 | 535 | B |
| 4 | 4 | 45 | 51 | 570 | B |
| 5 | 13 | 40 | 47 | 525 | A |
| 6 | 28 | 38 | 34 | 510 | A |
| 7 | 18 | 38 | 44 | 523 | A |
| 8 | 2 | 41 | 57 | 530 | A |
| 9 | 12 | 25 | 63 | 530 | A |
| 10 | 46 | 22 | 32 | 504 | A |
| 11 | 50 | 22 | 28 | 510 | A |
| 12 | 32 | 20 | 48 | 520 | A |
| C1 | 5 | 64 | 31 | 590 | C |
| C2 | 7 | 25 | 68 | 590 | C |

EXAMPLE 2

Figure 8:
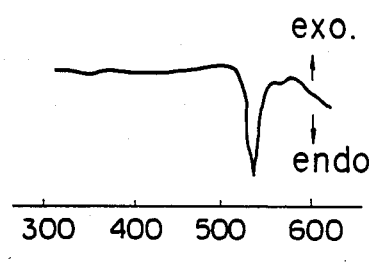
FIG. 8 is a DTA curve obtained from a flux according to Example 2.
Figure 9:
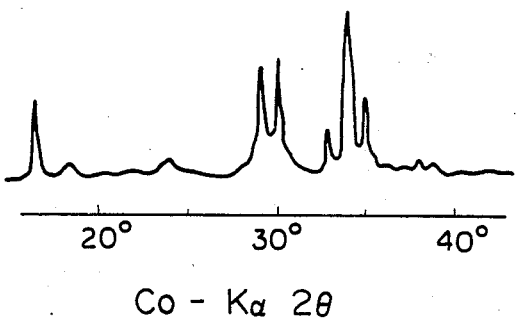
FIG. 9 is an X-ray diffraction pattern of the flux according to Example 2.

Cesium fluoride, potassium fluoride and aluminum fluoride were mixed in composition ratios shown at Run Nos. 13 to 17 in Table 2. 200 cc of water was added to 100 g of each mixture and, after they had been carefully mixed, the mixture was dried at 200° C. for an hour. The resulting solid was pulverized to form a flux embodying this invention. Each flux was examined by DTA and X-ray diffraction. The melting point of each flux obtained from its DTA curve is shown in FIG. 2. The results of X-ray diffraction indicated that each flux was a mixture of complexes having a complicated structure, and not containing KF and CsF. The DTA curve of the flux according to Run No. 13 and the results of its diffraction by Co-Kα rays are shown by way of example in FIGS. 8 and 9, respectively.

Figure 10:
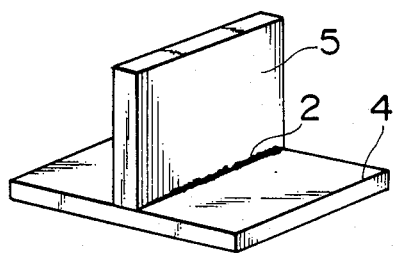
FIG. 10 is a perspective view of the materials brazed in Examples 2 and 3.

Each flux was tested to examine its brazability as will hereunder be described. A 3 cm square, 1 mm thick sheet 4 of an aluminum material containing about 1% by weight of magnesium (designated by JIS as A6061) and a 3 cm square, 1.6 mm thick brazing sheet 5 clad with an aluminum alloy containing 7% by weight of silicon (designated by JIS as BA12PC) were degreased with trichloroethylene, and supported as shown in FIG. 10 to prepare a test sample. An aqueous suspension containing 10% by weight of the flux was prepared, and after the test sample had then dipped in the suspension, removed therefrom and dried, it was heated at 610° C. for two minutes in a brazing furnace filled with a nitrogen atmosphere to be brazed.

A comparative flux was prepared as shown at Run No. C3 in Table 2, which was out of the composition range of this invention, and tested for brazing.

As a result, each flux according to this invention enabled the formation of a fillet 6 having a uniform width along a joint 2 between the sheets 4 and 5. (The results of brazing were satisfactory and the brazability in use of each flux was evaluated as A.) On the other hand, comparative flux C3 did not allow any appreciable flow of a brazing filler metal, and yielded a defective brazed product. Thus, the result of brazing was unsatisfactory and the brazability in use of each flux was evaluated as C.

TABLE 2

| Run No. | Composition of flux (mol %) | | | Melting starting point of flux (°C.) | Brazing efficiency of flux |
| --- | --- | --- | --- | --- | --- |
| | CsF | KF | AlF$_3$ | | |
| 13 | 33 | 20 | 47 | 520 | A |
| 14 | 65 | 5 | 30 | 460 | A |
| 15 | 48 | 5 | 47 | 505 | A |
| 16 | 34 | 5 | 61 | 518 | A |
| 17 | 62 | 3 | 35 | 480 | A |
| C3 | 1 | 57 | 42 | 560 | C |

EXAMPLE 3

An aqueous solution containing 0.22 mol of CsOH, 0.32 mol of KOH, 0.46 mol of Al(OH)$_3$ and 1.92 mol of HF in one liter of water was heated and the residue obtained after vaporization of the water was dried at 200° C. The resulting solid was pulverized to prepare a flux embodying this invention shown at Run No. 18 in Table 3.

Figure 11:
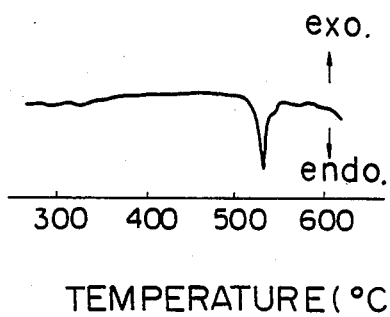
FIG. 11 is a DTA curve obtained from a flux according to Example 3.
Figure 12:
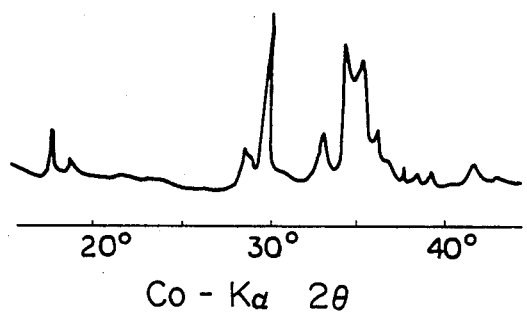
FIG. 12 is an X-ray diffraction pattern of the flux according to Example 3.

The melting point of this flux obtained from the DTA curve was 525° C. The results of diffraction by Co-Kα rays indicated that the flux was a mixture complexes not containing KF and CsF. The DTA curve of the flux and the results of X-ray diffraction are shown in FIGS. 11 and 12, respectively.

In addition, a further flux embodying this invention shown at Run. No. 19 in Table 3 was prepared as follows. Potassium fluoride and aluminum fluoridewere mixed in molar ratio of 55/45 and after the mixture had been fused and solidified, the resulting solid was pulverized to obtain potassium fluoro-aluminates. Whereas, cesium fluoride and aluminum fluoride were mixed in molar ratio of 67/33 together with water and the mixture was heated at 80° C. to be dried thereby to obtain cesium fluoro-aluminates. These potassium fluoro-aluminates and cesium fluoro-aluminates were mixed with an appropriate ratio to prepare a flux according to Run. No. 19.

In order to test each of these fluxes for brazing, a test sample having the same quality of the material and size as those of the sample used in Example 2 was dipped in an aqueous suspension containing 2% by weight of the flux. The test was carried out under the same condition as that in Example 2.

For comparison, there was prepared a comparative flux, as shown at Run No. C4 in Table 3 having an CsF/AlF$_3$ molar ratio of 67/33 and containing no KF, and it was tested for brazing as hereinabove described.

Since each of the fluxes according to this invention has a melting point higher than that of the comparative flux, it is only deteriorated with a small degree by sublimation and oxidation while heated to the brazing temperature. Therefore, it was possible to exhibit an excellent brazing performance with a small amount of application of the flux.

TABLE 3

| Run No. | Composition of flux (mol %) | | | Melting starting point of flux (°C.) | Brazing efficiency of flux |
| --- | --- | --- | --- | --- | --- |
| | CsF | KF | AlF$_3$ | | |
| 18 | 22 | 32 | 46 | 525 | A |
| 19 | 40 | 22 | 38 | 510 | A |
| C4 | 67 | — | 33 | 450 | C |

According to the comparative flux C4, on the other hand, a salt contained therein was dispersed and lost and, naturally, it did not act as a flux, resulting in no formation of a fillet as shown in FIG. 7. The result of brazing was unsatisfactory and therefore, the brazability thereof was evaluated as C as shown in Table 3.

What is claimed is:

1. A brazing flux having a melting starting point within a range of from 440° to 580° C., comprising potassium and fluoro-aluminum complexes, being free from free cesium fluoride and free potassium fluoride and having a composition corresponding to one of potassium fluoride, cesium fluoride and aluminum fluoride, wherein:
   the amount of potassium fluoride is up to and including 62 mol percent,
   the amount of cesium fluoride is from 2 to less than 74 mol percent, and
   the amount of aluminum fluoride is from 26 to 67 mol percent.

2. A method of brazing material comprising:
   disposing a brazing flux of claim 1 on a brazing desired material; and
   heating said material to join said material to another material with a filler metal at a temperature of lower than the melting point of said materials and higher than that of said filler metal.

3. A brazing flux according to claim 1, wherein the composition corresponds to one wherein the amount of potassium fluoride is at most 42 mol percent or to one wherein:
   the amount of potassium fluoride is from 42 to 54 mol percent,
   the amount of cesium fluoride is from more than 20 to 32 mol percent, and
   the amount of aluminum fluoride is less than 38 mol percent.

4. A method of producing brazing flux of claim 1 which comprises blending appropriate amounts of members selected from the group consisting of a potassium fluoro-aluminate, a cesium fluoroaluminate, a cesium potassium fluoro-aluminate and aluminum fluoride.

5. A method of brazing material comprising disposing a brazing flux of claim 3 on a brazing-desired material and heating the material to join said material to another material with a filler metal at a temperature of lower than the melting point of said materials and higher than that of said filler metal.

* * * * *